June 28, 1966   K. NASSAU ET AL   3,258,716
OPTICAL MASER COMPRISING THE ACTIVE MEDIUM $CaWO_4:Pr$
Filed Nov. 20, 1961
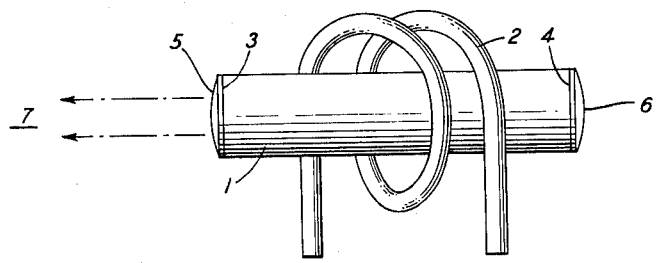
INVENTORS: K. NASSAU
S. P. PORTO
A. YARIV
BY
ATTORNEY

United States Patent Office 3,258,716
Patented June 28, 1966

3,258,716
OPTICAL MASER COMPRISING THE ACTIVE
MEDIUM CaWO₄:Pr
Kurt Nassau, Springfield, Sergio P. Porto, North Plainfield, and Amnon Yariv, Chatham, N.J., assignors to Bell Telephone Laboratories, Incorporated, New York, N.Y., a corporation of New York
Filed Nov. 20, 1961, Ser. No. 153,604
4 Claims. (Cl. 331—94.5)

This invention relates to optical masers for use in the infrared portion of the optical spectrum. The materials of the invention include a calcium tungstate host lattice and additionally contain praseodymium ions in the 3+ valence state.

Recently, considerable attention has been focused on a new class of solid state maser devices which are capable of generating or amplifying coherent electromagnetic wave energy in the optical frequency range. Devices of this type, which are described, for example, in United States Patent 2,929,922 to Schawlow and Townes, are considered to be operable over the spectral range from far infrared to ultraviolet, an equivalent bandwidth of about 10¹⁵ cycles. Such a bandwidth is capable of providing a large number of new communications channels, thereby multiplying the number of available channels which has heretofore been limited by the characteristics of the heavily used lower frequency portions of the spectrum.

Typically, a maser of the type known in the art employs an active material characterized by a plurality of distinct energy levels, the separation of these levels corresponding to frequencies within the desired operating frequency ranges. More particularly, the separation between two of the energy levels $E_1$ and $E_2$ corresponds to quantized wave energy having a frequency $\nu_{12}$ given by Bohr's equation $$\nu_{12} = \frac{E_2 - E_1}{h}$$

where $h$ is Planck's constant.

In accordance with the maser principle, wave energy in an appropriate frequency range is applied to an ensemble of paramagnetic ions, thereby "pumping" electrons from a lower energy level to a metastable higher level. The excited electrons tend to remain in the upper level for a short time before decaying or relaxing to the lower level. The downward transition is normally accompanied by the radiation of wave energy of the frequency corresponding to separation between the energy levels concerned. During maser operation sufficient pump power is supplied to the active medium to produce, at least intermittently, a nonequilibrium population distribution between the pair of energy levels. More particularly, the population of the upper level is increased with respect to that of the lower level. When the population of the upper level exceeds that of the lower level, a population inversion or negative temperature is considered to obtain. Operation of the maser is dependent upon the fact that a small signal at the proper frequency acts to stimulate the downward transition of the excited electrons from the metastable state, and that the stimulated emission is coherent and in phase with the signal.

Among the more promising forms of maser are those which utilize an active medium characterized by first, second, and third successively higher electron energy levels. Typically, in optical maser materials the upper level is relatively broad, and in some cases is best described as a band. Continuous wave operation of such three-level devices may be achieved, for example, by pumping electrons from the first to the third level from which they relax spontaneously, by nonradiative processes, to the second level, thereby producing the desired population inversion between the second and first levels. Advantageously, in masers of this type, the relaxation time between the third and second levels is shorter than that between the second and first levels so that the population of the second level may be continuously maintained during operation of the device. Additionally, as the magnitude of the negative temperature attained depends on the relative populations of the first and second levels the energy level system of preferred materials also include mechanisms which continuously depopulate the terminal state of the optical transition. Thus, the population inversion is maintained at a relatively high value and maser action is facilitated.

Among the more promising active maser materials are those which comprise a host crystal containing paramagnetic ions from which the stimulated emission occurs. The host crystal must be of a material capable of accepting the paramagnetic ions in such a way that they are able, upon excitation, to fluoresce with good over-all quantum efficiency, with as much as possible of the emitted energy concentrated in a single narrow spectral line. More particularly, the host must accept the ions in such a way as to minimize coupling between them and the crystal lattice at the maser frequency, while simultaneously permitting relaxation from the pump band to the metastable state. Additionally, the host crystal should be of good optical quality. That is to say, it must be relatively free of scattering centers and hence transparent to light waves at the operating frequency of the maser. Furthermore, the host should have a low coefficient of absorption at the pump frequency to minimize heating of the maser medium and to promote more efficient utilization of the pump power. Chemical and physical stability are further desiderata. It is also required that the host be a mechanically workable material, capable of being accurately shaped and highly polished.

A combination of paramagnetic ions with a host lattice meeting the above-mentioned conditions is ruby, which continues to be widely used as an optical maser medium and is, in fact, one of the very few materials which have been operated successfully. Ruby has usable emission lines at 0.6943 micron and 0.6921 micron. In addition, ruby having a high concentration of chromium ions is characterized by sharp satellite lines at 0.7009 micron and 0.7041 micron. Another successful material, operable at liquid hydrogen temperatures, comprises a calcium fluoride host lattice containing samarium ions. Emission from the samarium ions is at 0.7082 micron. A more recently discovered optical maser medium, disclosed in copending application Serial No. 139,266, filed September 19, 1961, of Johnson and Nassau, is calcium tungstate containing trivalent neodymium ions. Additional newly discovered materials are disclosed in copending applications Serial Nos. 153,603; 153,605; 153,606 and 153,607, all filed concurrently. These include thulium in calcium tungstate operating at about 1.91 microns; neodymium in calcium fluoride operating at about 1.046 microns; holmium in calcium tungstate operating at about 2.046 microns; and neodymium in strontium molybdate operating at about 1.06 microns.

Ruby optical masers of the usual design are subject to the disadvantage of requiring a high pump power to establish the required population inversion. The amount of power supplied to the ruby and the conditions of its absorption by the crystal have thus far limited ruby maser operation to producing a pulsed beam of coherent light. It is apparent, however, that in many applications it is highly desirable to produce continuous coherent light beams by maser action.

Furthermore, it is to be noted that the choice of active medium for an optical maser device governs the frequency of the usable emission lines. Thus, it is desirable to provide a variety of optical maser materials in order to make possible the generation and amplification of coherent light beams over the wide range of the optical frequency spectrum. However, despite the discovery of several operable materials, no known theory has been able to predict which combinations of ions and host lattices will be successful.

An object of the invention is the generation and amplification of coherent radiation in the infrared portion of the optical frequency spectrum.

It is also an object of the invention to provide an optical maser capable of operation in the infrared range and requiring a relatively low pumping power.

In accordance with this invention, a new fluorescent material suitable for use in optical masers has been discovered. This material consists of a calcium tungstate host lattice in which some of the calcium ions have been replaced by praseodymium ions in the 3+ valence state. Trivalent praseodymium is the active maser medium and simulated emission is produced at low temperatures at 1.047 microns in the infrared region.

A feature of the invention is an optical maser having an active medium consisting of trivalent praseodymium ions in a calcium tungstate host crystal.

An optical maser in accordance with the invention is shown in the figure. There is depicted a rod-shaped crystal 1 of calcium tungstate having an appropriate small concentration of trivalent praseodymium ions as disclosed herein. Pump energy is supplied by a helical lamp 2 encompassing rod 1 and connected to an energy source not shown. Ends 3 and 4 of rod 1 are ground and polished in the form of confocal spherical surfaces. Reflective layers 5 and 6 are deposited on ends 3 and 4, thereby forming an optical cavity resonator of the type described in a copending patent application Serial No. 61,205, filed October 7, 1960, by Boyd, Fox and Li, and issued September 25, 1962, as United States Patent No. 3,055,257. Advantageously, layer 6 is highly reflecting while layer 5 includes at least a portion which is only partially reflecting to permit the escape of coherent radiation 7 having a wavelength of about 1.047 microns. Rod 1 during operation is advantageously maintained in a bath of a liquified gas, such as nitrogen, to maintain a temperature below about 80° K.

The lamp 2 is advantageously of a type which produces intense radiation over a broad band extending from about 0.4 micron to longer wavelengths. Mercury or xenon lamps are considered useful to pump the material of the invention, which is characterized by a plurality of narrow absorption bands in the specified spectral range. Other types of lamps may, of course, be employed provided they emit sufficient energy at wavelengths corresponding to one or more absorption lines of the material. Electrons in the active medium are excited to upper energy levels by the pump power and relax through nonradiative processes to an intermediate level belonging to the $^1G_4$ multiplet of the praseodymium ion. This level corresponds to the metastable level of the above-mentioned exemplary three-level system. A negative temperature is thus created between the level belonging to the $^1G_4$ multiplet and a level belonging to $^3H_4$ multiplet. This terminal level lies about 400 cm.$^{-1}$ above the ground state and has a negligible population at temperatures below about 80° K. Stimulated emission at 1.0468 microns in the infrared is produced by this device.

An optical maser of the type illustrated in the figure has been operated using as an active medium calcium tungstate containing 0.5 atomic percent of praseodymium in place of calcium. The device produced intense emission at 1.0468 microns in the infrared. The emission line is very narrow. Maser action may be achieved over a range of praseodymium concentration. Although in principle there is no lower limit on the concentration of $Pr^{+3}$ which may be employed in the crystal 1, yet a practical limit of about 0.01 percent is imposed by the necessity of having sufficient unpaired electrons available to produce a useful output.

Additionally, the preferred concentration of $Pr^{+3}$ ions in the $CaWO_4$ host crystal is deemed to be about 1 percent. Such a concentration appears desirable from the standpoint of maximum intensity in the narrowest possible line. However, useful concentrations are deemed to extend as far as 3 percent $Pr^{+3}$. Beyond 3 percent increasing account must be taken of line broadening due to interaction among the praseodymium ions themselves. Although stimulated emission may be obtained with concentrations as high as 10 percent, most applications will require a maximum of about 3 percent. Furthermore, crystals having more than about 3 percent praseodymium ions are somewhat more difficult to manufacture than are those having smaller concentrations.

From measurements made on the device described above, it is estimated that the power required to operate a maser in accordance with the invention is about 2 percent of that required to operate a ruby maser of similar configuration under the same condition.

The material of the invention is conveniently made by a method generally designated as the Czochralski method. Reference may be made to an article by J. Czochralski in Z. Physik Chemie, vol. 92, pages 219–221 (1918). A recent description of the process is to be found in an article by K. Nassau and L. G. Van Uitert in Journal of Applied Physics, vol. 31, page 1508 (1960). Among the other techniques which may be employed are the flame fusion, hydrothermal flux and spontaneous nucleation techniques.

A particular sample of the substance was prepared by placing 200 grams of $CaWO_4$ in a rhodium crucible and melting it. 0.3 gram of $Pr_2O_3$ and 0.63 gram of $WO_3$ were then added to the melt and a homogeneous mixture produced. A seed crystal of the desired orientation was inserted into the top surface of the melt and was simultaneously rotated and drawn from the melt. Good results were obtained when the speed of rotation was about 30 r.p.m. and the rate of pulling or drawing was about ½ inch per hour. The resulting calcium tungstate crystal contained about 0.1 percent praseodymium ions in place of calcium.

It will be noted that a considerable excess of praseodymium ions was added to the melt. In general, it has been found that the concentration of praseodymium in the crystal is about one-third of that in the melt. Praseodymium may be also added in various other forms such as $Pr_2(WO_4)_3$ or $NaPrW_2O_8$.

Although the invention has been described with reference to a specific embodiment, this is to be construed by way of illustration and does not limit the scope of the invention. For example, the material of the invention may be used with any concentration of praseodymium in the ranges set forth. Furthermore, the material may be used in optical cavity resonators other than the confocal type. The parallel plate resonator, as well as others, may also be employed. Other variations are also possible within the spirit of the invention.

What is claimed is:

1. An optical maser comprising a negative temperature medium consisting essentially of a substantially monocrystalline calcium tungstate host lattice in which a portion of the calcium ions have been replaced by praseodymium ions in the trivalent state, the portion of calcium ions so replaced being in the range of from 0.01 percent to 10 percent, means for producing a population inversion between a pair of optically connected energy levels of said praseodymium ions, and means for stimulating coherent emission at the wavelength corresponding to the energy separation of said levels.

2. An optical maser comprising a negative temperature medium consisting essentially of a substantially monocrystalline calcium tungstate host lattice in which a portion of the calcium ions have been replaced by praseodymium ions in the trivalent state, the portion of calcium ions so replaced being in the range of from 0.01 percent to 3 percent, means for producing a population inversion between a pair of optically connected energy levels of said praseodymium ions, and means for stimulating coherent emission at the wavelength corresponding to the energy separation of said levels.

3. An optical maser comprising means forming an optical cavity resonator, a negative temperature medium disposed within said resonator, said medium consisting essentially of substantially monocrystalline calcium tungstate host lattice in which a portion of the calcium ions have been replaced by praseodymium ions in the trivalent state, the portion of calcium ions so replaced being in the range of from about 0.01 percent to about 5 percent, and means for pumping said medium to produce a population inversion between a pair of optically connected energy levels of said praseodymium ions.

4. An optical maser comprising a rod shaped substantially monocrystalline negative temperature medium consisting essentially of calcium tungstate in which a portion of the calcium ions have been replaced by trivalent praseodymium ions, said rod having confocal spherical end surfaces, the portion so replaced being in the range from 0.01 percent to 5 percent, said end surfaces being covered with a reflective layer thereby forming an optical cavity resonator in said medium, and pumping means disposed about said rod for producing a population inversion between a pair of optically connected energy levels of said praseodymium ions.

References Cited by the Examiner

UNITED STATES PATENTS

| | | | |
|---|---|---|---|
| 2,929,922 | 3/1960 | Schawlow et al. | 88—1 |
| 3,055,257 | 9/1962 | Boyd et al. | 88—1 |

OTHER REFERENCES

Kroger: "Some Aspects of the Luminescence of Solids," Elsevier Pub. Co. Inc., New York, 1948, pages 146 and 294.

TOBIAS E. LEVOW, *Primary Examiner.*

JULIUS GREENWALD, MAURICE A. BRINDISI, *Examiners.*

R. D. EDMONDS, *Assistant Examiner.*